United States Patent [19]
Herfurth et al.

[11] Patent Number: 5,594,323
[45] Date of Patent: Jan. 14, 1997

[54] CONTROL PROCESS FOR A VOLTAGE TRANSFORMER WITH A WIDE INPUT VOLTAGE RANGE AND THE APPLICATION OF SUCH A PROCESS

[75] Inventors: Michael Herfurth, Gilching; Helmut Bichler, Gräfelfing, both of Germany

[73] Assignee: Siemens Aktiengesellschaft, Munich, Germany

[21] Appl. No.: 431,495

[22] Filed: Apr. 28, 1995

Related U.S. Application Data

[63] Continuation-in-part of Ser. No. 110,383, filed as PCT/DE92/00135, Feb. 21, 1992, abandoned.

[30] Foreign Application Priority Data

Feb. 21, 1991 [DE] Germany .................. 41 05 463.6

[51] Int. Cl.$^6$ ...................................... G05F 1/614
[52] U.S. Cl. .......................... 323/222; 323/285
[58] Field of Search ................... 323/222, 223, 323/282, 283, 284, 285

[56] References Cited

U.S. PATENT DOCUMENTS

| | | | |
|---|---|---|---|
| 4,347,474 | 8/1982 | Brooks et al. | 323/224 |
| 4,355,277 | 10/1982 | Davis et al. | 323/351 |
| 4,386,394 | 5/1983 | Kocher et al. | 363/20 |
| 4,437,146 | 3/1984 | Carpenter | 363/21 |
| 4,536,700 | 8/1985 | Bello et al. | 323/285 |
| 4,542,330 | 9/1985 | Terbrack | 323/222 |
| 4,677,366 | 6/1987 | Wilkinson et al. | 323/222 |
| 5,289,361 | 2/1994 | Vinciarelli | 323/222 X |
| 5,349,284 | 9/1994 | Whittle | 323/222 X |
| 5,359,276 | 10/1994 | Mammano | 323/222 X |
| 5,438,505 | 8/1995 | Cohen | 323/285 X |

OTHER PUBLICATIONS

Siemens Publ. LE 8803 (Herfurth), Feb. 1990, "Aktives Überschwingungsfilter mit TDA 4814 A . . . ".
Siemens HL–Anwendungsbericht PD22 8905 (Herfurth), Feb. 1990, "Steuerschaltung mit TDA 4816 . . . ".
Siemens HL Anwendungsbericht PD22 9002 (Herfurth) Feb. 1990, "Aktives Oberschwingungsfilter . . . ".
Siemens Components 24 (1986) No. 3 (Herfurth), pp. 103–107, "TDA 4814–Integrierte Steuerschaltung . . . ".
Siemens Components 24 (1986) No. 1 (Herfurth), pp. 9–13, "Aktive Oberwellenfilterung für Netzgleich . . . ".
IEEE Publ. 89CH2721–9 (Williams), pp. 959–967, 1989, "Design of Feedback Loop in Unity Power Factor AC . . . ".

*Primary Examiner*—Peter S. Wong
*Assistant Examiner*—Y. J. Han
*Attorney, Agent, or Firm*—Herbert L. Lerner; Laurence A. Greenberg

[57] ABSTRACT

A control process for a voltage transformer for sine-wave line current input with a large input voltage range, includes controlling or regulating the input current of the voltage transformer as a function of a current command value. The output voltage of the voltage transformer is in the form of an actual value input quantity of a controller which supplies a control signal as a function of an output voltage command value. The above-mentioned current command value is obtained by multiplying a signal proportional to the rectified input voltage of the voltage transformer by the above-mentioned control signal, and also by a direct current voltage signal which is a reciprocal of the peak value, to the effective value or to the average value of the input voltage of the voltage transformer. Such a process is preferably used in a switched-mode voltage transformer, e.g. in an isolating transformer, a step-up transformer or a step-up/step-down transformer.

2 Claims, 1 Drawing Sheet

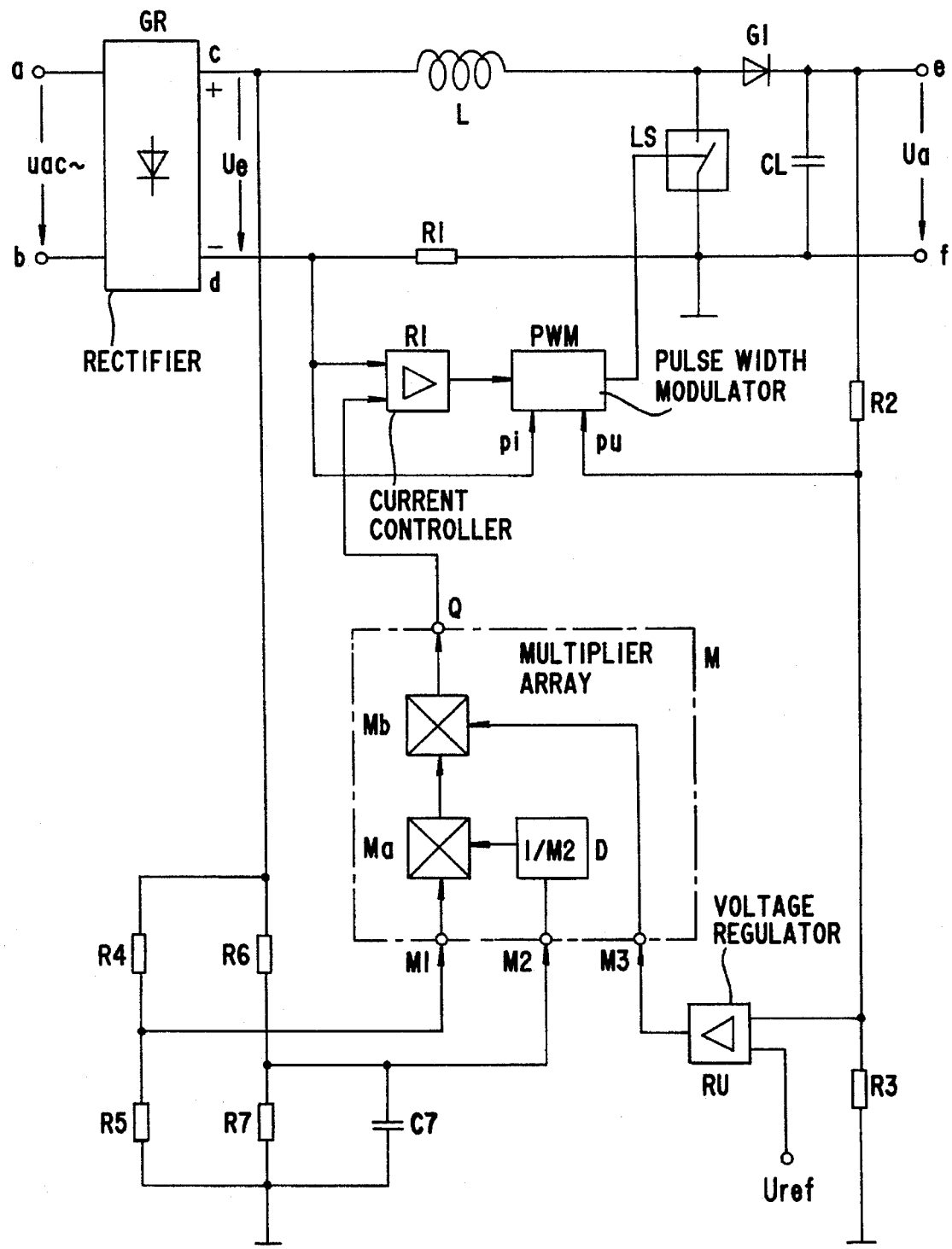

5,594,323

CONTROL PROCESS FOR A VOLTAGE TRANSFORMER WITH A WIDE INPUT VOLTAGE RANGE AND THE APPLICATION OF SUCH A PROCESS

CROSS-REFERENCE TO RELATED APPLICATION

This application is a continuation-in-part of application Ser. No. 08/110,383, filed Aug. 23, 1993 now abandoned; which was a continuation of international application PCT/DE92/00135, filed Feb. 21, 1992.

BACKGROUND OF THE INVENTION

1. Field of the Invention

The invention relates to a control process for a voltage transformer with a wide input voltage range and the application of such a process.

Transformers, e.g. isolating transformers, step-up transformers or step-up/step-down transformers, can be used to improve the power factor of power rectification. Such transformers are theoretically capable of continuously transforming an input voltage and supplying a regulated output voltage. With suitable control of such a transformer, it is possible, in connection with a power rectifier, to take a sine-wave current from an alternating current power supply and supply a regulated direct current voltage at the output. Step-up transformers with such characteristics are disclosed, for example, in the following articles or application reports by Michael Herfurth, one of the inventors of the instant application:

"Aktive Oberwellenfilterung für Netzgleichrichter höherer Ausgangsleistung" [Active Harmonic Filtering for High Output Power Rectifiers], Siemens Components 24 (1986), Volume 1, pages 9 to 13;

"TDA 4814—Integrierte Steuerschaltung für sinusförmige Netzstromaufnahme" [TDA 4814—Integrated Control Circuit for Sine-Wave Line Current Input], Siemens Components 24 (1986), Volume 3, pages 103–107;

"Aktive Oberschwingungsfilter mit TDA 4814 A für 250 W Ausgangsleistung" [Active Harmonic filter with TDA 4814 A for 250 W Output Power], Siemens-Bericht LE8803, Aug. 19, 1988;

"Steuerschaltung mit TDA 4816 und TDA 4919 für ein aktives Oberschwingungsfilter (Control Circuit with TDA 4816 and TDA 4919 for an Active Harmonic Filter], Siemens HL-Anwendungsbericht PD22 8905, November 1989; and "Aktives Oberschwingungsfilter mit konstanter Betriebsfrequenz und 600 W Ausgangsleistung" [Active Harmonic Filter with Constant Operating Frequency and 600 W output], Siemens HL-Anwendungsbericht PD22 9002, February 1990.

The control principle of that circuit of the prior art requires a control amplifier, having an actual-value input to which a signal is applied that is a function of the output voltage of the transformer, which is compared to a command or setpoint value of the output voltage, and having an output that forms one input of a multiplier. Another input of the multiplier is a time-dependent analog signal which is proportional to the rectified input voltage of the voltage transformer. Since, in the steady state, the control amplifier supplies a direct current voltage as the output value, the multiplier supplies a signal at its output having a time-dependent curve which is defined by the rectified input voltage of the voltage transformer, and has an amplitude that is defined by the output of the control amplifier. The output signal from the multiplier forms a command or setpoint value entry or input for the input current of the transformer, i.e. the line current input. A circuit connected downstream of the multiplier supplies supplies control pulses for the power breaker or breakers of the transformer, as a function of the command or setpoint value input of the transformer input current and as a function of the actual curve of the transformer input current. The layout of that circuit is primarily a function of the type of transformer. One simple possibility for the activation of a switched-mode step-up transformer is disclosed in the above-referenced article "TDA 4814—Integrated Control Circuit for Sine-Wave Line Current Input", in which only one comparator compares a voltage proportional to the input current of the transformer to the command or setpoint value entry of the multiplier, and when a peak value is reached which corresponds to the command or setpoint value, deactivates the power breaker of the transformer, and whereby the power breaker is reactivated as soon as a zero current detector determines that the input current of the transformer has become zero.

An additional possibility for converting the command or setpoint value input of a multiplier output of a control circuit as described above into control pulses for power breakers of a transformer can be seen in the fact that downstream of the multiplier, there is an additional controller, which adjusts the actual value of the input current of the transformer to the command or setpoint value specified by the multiplier, and provides either an analog signal or a clocked signal supplied by a pulse width modulator for the activation of the power breaker or breakers of a transformer. A configuration which operates according to such a process is described, among other places, in the article "Active Harmonic Filtering for High Output Power Rectifiers" by M. Herfurth, reprinted from an article which appeared in "Siemens Components" 24 (1986), Volume 1, pages 9 to 13, and in the Siemens HL-Anwendungsbericht PD22 8905 under the title "Control Circuit with TDA 4816 and TDA 4919 for an Active Harmonic Filter", by M. Herfurth.

A common feature of all of the voltage transformers described above is a control process with a multiplier, having an output signal which provides the reference value for a current comparator or current controller, whereby the current comparator or current controller controls the input current of the voltage transformer. The input voltage of the transformer, which has an amplitude that has been reduced by a voltage divider, is applied to one of the inputs of the multiplier, and the output voltage from a voltage regulator which controls the output voltage of the transformer is applied to the other input of the multiplier. Thus a signal is provided at the output of the multiplier which has the wave form of the rectified line voltage, and the amplitude of which can be modified by the voltage regulator.

Since the transformers described above can transform continuously and with high efficiency to another voltage level, it can be inferred that such transformers can also be used to feed a load both from a 110 V power supply or main and also from a 220 V power supply or main, without the need for additional switching measures. That is possible with the transformers described above, which operate using the control processes described above.

Due to their circuitry, multiplier circuits and their signal inputs have a restricted dynamic range. In order to get a defined output level on the multiplier, the input level cannot drop below a specified value at any of the signal inputs of the multiplier.

Moreover, the input signal level cannot exceed an input-specific value at any of the inputs, so that the output signal of the multiplier circuit is a function of the input signal, in the desired manner. Therefore, in voltage transformer circuits in which the above-mentioned control process is realized, this restricted dynamic range of a multiplier circuit also restricts the allowable input voltage range, or the quotient of the maximum allowable input voltage and the minimum allowable input voltage. In order to provide a desired command or setpoint value at the output of the multiplier, namely when there is a fixed maximum allowable input voltage, the input voltage of the voltage transformer may not be so low that the input signal of the multiplier derived from it is below a specified level. Moreover, the input voltage of the voltage transformer may only be so low that to supply a desired command or setpoint value level at the output of the multiplier, the voltage supplied by the voltage regulator at the input of the multiplier does not exceed an allowable level.

SUMMARY OF THE INVENTION

It is accordingly an object of the invention to provide a control process for a voltage transformer with a wide or broad input voltage range and an application of such a process, which overcome the hereinafore-mentioned disadvantages of the heretofore-known methods and devices of this general type and in which the input voltage range is not so restricted by the response characteristic of a multiplier.

With the foregoing and other objects in view there is provided, in accordance with the invention, a control process for a voltage transformer for sine-wave line current input with a large input voltage range, which comprises the steps of:

controlling an input current of the voltage transformer as a function of a first current control value;

controlling the output voltage of the voltage transformer with a voltage control signal, wherein said voltage control signal is a function of an output voltage of the voltage transformer; and obtaining a second current control value by multiplying a signal proportional to a rectified input voltage of the voltage transformer by the voltage control signal, and multiplying by a direct current voltage signal being a reciprocal of an average value of the input voltage of the voltage transformer.

In accordance with an additional mode of the invention, the process further comprises stepping up the output voltage of the voltage transformer by means of an inductor connected between the input and output of the voltage transformer.

In accordance with a concomitant mode of the invention, there is provided a control process which comprises selecting the voltage transformer as a switched-mode voltage transformer, or an isolating transformer, or a step-up transformer, or a step-up/step-down transformer.

The invention teaches that the problem can be solved if the multiplier is expanded by a division by a direct current voltage proportional to the input voltage. This direct current voltage proportional to the input voltage can, for example, be the peak value of the input voltage, the temporal average value of the input voltage, or the effective value of the input voltage. In this manner, the maximum command or setpoint value entry for the input current of the voltage transformer becomes independent of the level of the input voltage.

In order to apply the process, an additional multiplier can be connected upstream of a multiplier of the prior art, whereby an input signal of this upstream multiplier is derived from the rectified input voltage of the voltage transformer, and a direct current voltage is applied to the other input of this upstream multiplier which is inversely proportional to the input voltage of the voltage transformer, e.g. inversely proportional to the peak value, to the effective value or to the average value of the input voltage.

However, possible realizations of the control process claimed herein include any configuration of a multiplier with three inputs, whereby one input receives the output signal of a voltage regulator, one input receives a direct current voltage which is inversely proportional to the peak value, effective value or average value of the input voltage of the voltage transformer, and one input receives a time-dependent signal which is proportional to the rectified input voltage of the voltage transformer. In contrast to the control processes of the prior art, in such control methods according to the invention, the necessary intervention of the control when there is a change in the input voltage is divided uniformly over all three inputs of the multiplier, which significantly decreases the signal range to be processed. The current load of the component of the transformer is determined as a function of the input current, which in the limit case remains constant with this control process. That means that the transformer at higher input voltage, if necessary, can output more power, while the load on the components does not change. A transformer controlled in this manner has a greater control reserve with increasing input voltage, with optimal utilization of the components.

Other features which are considered as characteristic for the invention are set forth in the appended claims.

Although the invention is illustrated and described herein as embodied in a control process for a voltage transformer with a wide input voltage range and the application of such a process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The figure is a schematic and block circuit diagram of an embodiment of the invention.

DESCRIPTION OF THE PREFERRED EMBODIMENTS

Referring now to the single figure of the drawing in detail, there is seen an embodiment of the invention with a step-up transformer, being formed of a rectifier array GR with input terminals a and b, to which an AC voltage uac is applied. At output terminals c and d, this rectifier array GR supplies a rectified voltage Ue with a periodically fluctuating instantaneous value. A connection of a power breaker LS and an anode connection of a diode G1 are also connected to the output terminal c of the rectifier array GR which supplies the positive potential. A cathode connection of the diode G1 forms an output terminal e of the step-up transformer and is connected by means of a charging capacitor CL with an output terminal f of the step-up transformer. The output terminal f of the step-up transformer is also connected to another connection of the power breaker LS, and is connected by means of a resistor R1, which is selected to measure the load current, to the output terminal d of the rectifier array GR. The step-up transformer described above supplies a direct current voltage Ua between the output terminals e and f. The terminal e is connected by means of a series circuit of two resistors R2 and R3 to reference potential ground. A connection point of these two resistors R2 and R3 delivers a voltage proportional to the output voltage Ua and is connected to one input of a voltage regulator RU. Another input of this voltage regulator RU receives a reference potential Uref. The voltage regulator RU compares the output voltage Ua of the step-up transformer to the reference voltage Uref and when there is a deviation of the output voltage Ua from a specified command or setpoint value, it applies a suitable voltage M3 to one input of a multiplier array M. An inductor L is connected between the positive terminal c of the rectifier array GR and the diode G1.

The terminal c which supplies the positive potential of the voltage Ue is connected by means of a series circuit of two resistors R4 and R5 and by means of a series circuit of two resistors R6 and R7, to reference potential ground. A capacitance C7 is parallel to the resistor R7. A voltage M1 which is supplied at a connection point between the resistors R4 and R5 is proportional to the instantaneous value of the voltage Ue. A voltage M2 is made available at a connection point of the resistor R6 and R7 and at the capacitance C7. Due to the integrating action of the capacitance C7, the voltage M2 is proportional to the arithmetic average of the voltage Ue and is thus also proportional to the peak value of the input voltage uac. The connection point of the resistors R4 and R5 and the connection point of the resistors R6 and R7 are each connected to an input of the multiplier array M. The multiplier array M must be realized in such a way that it supplies an output signal Q, for which the following relationship is valid:

$$Q = \frac{M1 \times M3}{M2}$$

Such a multiplier array can be realized, for example, from two conventional multiplier circuits, whereby the input which receives the voltage M2 is inverted, or an analog inverter circuit is connected upstream of it. Multiplier basic circuits which can be used for the purpose are described, for example, in the book by Tietze and Schenk entitled: "Halbleiterschaltungstechnik" [Semiconductor Circuit Technology], 2nd Edition, 1971, in Chapter 11.16.2 on pages 288 to 293. FIG. 11.115 in particular shows a differential amplifier circuit being formed of two transistors having emitter connections which are coupled and are connected by means of a resistance R2 to a potential U2. The base terminal of one of the transistors is connected to ground potential, and the base terminal of the other transistor of the differential amplifier circuit is connected to a voltage u1. The collector connections of the two transistors are connected to the two inputs of an operational amplifier that is connected as an inverting proportional amplifier. The output of that operational amplifier supplies a voltage which is proportional to the voltage u1 at the base terminal of a transistor, multiplied by the common emitter current of the two transistors and, due to the resistor R2, therefore by the voltage u2. On page 290 of that book, a multiplier circuit is described having an output voltage that is proportional to the quotient of two input voltages. For that purpose, in the circuit illustrated in FIG. 11.115 on page 289, the feedback of the operational amplifier must not be connected to the inverting input of that operational amplifier, but instead the feedback must be connected to the current input of the difference amplifier, i.e. the terminal with the voltage u2.

In order to provide a realization of the multiplier circuit M illustrated in the figure, the input to which the voltage M2 is applied can therefore be connected to a circuit configuration D which supplies an output signal that is proportional to the reciprocal of the input signal. An output of the circuit configuration D can be connected to one input of a conventional multiplier array Ma, having another input which is connected to the input of the multiplier array M to which the voltage M1 is applied. An output of the multiplier Ma can be connected to one input of an additional multiplier Mb. Another input of the additional multiplier Mb is then connected to the input of the multiplier array M to which the voltage M3 is applied. An output of the additional multiplier Mb forms the output Q of the multiplier array M. The elements Ma and D of such a variant realization can be realized by means of a multiplier as described above, having an output signal which is proportional to the quotient of the two input signals.

The output Q of the multiplier array M in the figure is connected to one input of a current controller RI. Another input of this current controller RI is connected to a voltage which is proportional to the instantaneous input current of the step-up transformer. For this purpose, this input is connected to the terminal d of the rectifier array GR, which is connected by means of the resistor R1 to ground potential. Since the input current of the step-up transformer flows through the resistor R1, the voltage between the terminal d and the ground potential is proportional to the load current.

An output of the current controller RI is connected to an input of a pulse width modulator circuit PWM. An output of this pulse width modulator circuit is connected to a control input of the power breaker or load switch LS.

In the embodiment illustrated in the figure, the pulse width modulator circuit PWM also contains protective functions against an excessive output voltage and an excessive input current of the step-up transformer. This is represented by the fact that a signal proportional to the input current is applied to an input pi of the pulse width modulator circuit PWM and a signal proportional to the output voltage Ua is applied to an input pu of the pulse width modulator circuit PWM.

The control process described above is particularly well suited for use in switched-mode voltage transformers, such as isolating transformers, step-up transformers or step-up/step-down transformers. In the book entitled "Schaltnetzteile, Konzepte, Bauelemente, Anwendungen" [Switched Mode Power Supplies, Concepts, Components, Applications] by W. Hirschmann and A. Hauenstein, published in 1990 by Siemens Aktiengesellschaft, Berlin and Munich, basic switched mode power supply circuits are described on pages 40 et seq. On pages 40 and 41, the book describes a step-down transformer, on page 42 a step-up transformer, on page 43 an inverter, on page 44 a step-up/step-down transformer, and on pages 45 to 50, it describes various basic isolating transformer circuits. Switched mode power supply components for sine-wave line inputs are described in Chapter 6 on pages 436 to 448.

During the switch-on phase of the switch LS the output terminal of the inductor L is connected to ground. A current flows through the inductor L and the current builds up a voltage along the inductor L. During the switch-off phase of the switch LS, on the other hand, the current through the inductor L remains the same due to the constant current and the current flows through the diode G1 into the charge or load capacitor CL. The input terminal of the inductor L is connected to the positive terminal of the rectifier array GR. The voltage Ua which can be tapped at the load capacitor CL is therefore greater than the input voltage Ue. The result is that the circuit is defined as a step-up transformer.

It is important to note in the context of the instantly disclosed invention that a division is performed of the two signals M1 and M2, in that M1 is multiplied with the reciprocal value of M2.

The technical teaching which can be inferred from all of the cited literature references by one skilled in the art, is incorporated as part of the disclosure of the present patent application.

We claim:

1. A control process for a voltage transformer for sine-wave line current input with a large input voltage range, which comprises the steps of:

controlling an input current of the voltage transformer as a function of a first current control value;

controlling the output voltage of the voltage transformer with a voltage control signal, wherein said voltage control signal is a function of an output voltage of the voltage transformer, and obtaining a second current control value by multiplying a signal proportional to a rectified input voltage of the voltage transformer by the voltage control signal, and multiplying by a direct current voltage signal being a reciprocal of an average value of the input voltage of the voltage transformer.

2. The control process according to claim 1, which further comprises stepping up the output voltage of the voltage transformer by means of an inductor connected between the input and output of the voltage transformer.

* * * * *